V. M. WEAVER.
PROCESS OF SECURING ELEMENTS FROM THEIR COMPOUNDS.
APPLICATION FILED JAN. 14, 1915.

1,241,796.

Patented Oct. 2, 1917.

Witnesses:
Frederick L. Pierce
Cameron A. Whitsett

Inventor:
Victor M. Weaver
By Brown, Hanson & Boettcher
Attorneys

UNITED STATES PATENT OFFICE.

VICTOR M. WEAVER, OF HARRISBURG, PENNSYLVANIA, ASSIGNOR TO WEAVER COMPANY, A CORPORATION OF WISCONSIN.

PROCESS OF SECURING ELEMENTS FROM THEIR COMPOUNDS.

1,241,796.  Specification of Letters Patent.  Patented Oct. 2, 1917.

Original application filed August 22, 1914, Serial No. 858,001. Divided and this application filed January 14, 1915. Serial No. 2,234.

*To all whom it may concern:*

Be it known that I, VICTOR M. WEAVER, a citizen of the United States, residing at Harrisburg, in the county of Dauphin and State of Pennsylvania, have invented a certain new and useful Improvement in Processes of Securing Elements From Their Compounds, of which the following is a full, clear, concise, and exact description, reference being had to the accompanying drawings, forming a part of this specification.

My invention relates to a process of securing elements from their compounds. While it will appear to those skilled in the art that my invention may be employed in the treatment of any substances having the proper chemical and physical characteristics, my invention is concerned particularly with the securing of silicon from silicon tetra-chlorid, as pointed out in the more specific of the appended claims.

This application is divisional from my copending application Serial No. 858,001, filed August 22, 1914, which is concerned with a process for winning elements and which, in its more specific aspects, relates to the treatment of clay in order to secure the aluminum and the silicon therefrom.

The claims in the parent application are drawn toward the process as a whole, that is, the complete process, beginning for instance with clay and the proper reagents, and ending with the recovery of the aluminum or silicon or both in their elementary states.

The present application has to do with the securing of the silicon from the silicon tetrachlorid which is formed in the above-mentioned process.

In order to instruct those skilled in the art I shall now proceed with a specific description of my invention as embodied in my process of securing aluminum and silicon from clay, and shall refer to and describe the various parts of the apparatus and the various stages in the process in detail, in order that I may make a complete and intelligent disclosure.

In the treatment of clay, I break up the compound by the use of chlorin gas so as to produce aluminum chlorid and silicon tetrachlorid, this action being carried on under special restrictions and conditions, as will later be more fully described. With the silicon tetrachlorid thus produced, the next step, so far as this particular part of the process is concerned, is to secure the silicon therefrom. This I do by feeding the silicon tetrachlorid into a chamber containing molten aluminum, and by reason of the greater affinity of the chlorin for the aluminum than the silicon, the silicon is released and may be tapped off, the aluminum chlorid remaining, all as specially pointed out in the appended claims.

My invention will be more readily understood by reference to the accompanying drawings, in which.

Figure 1:
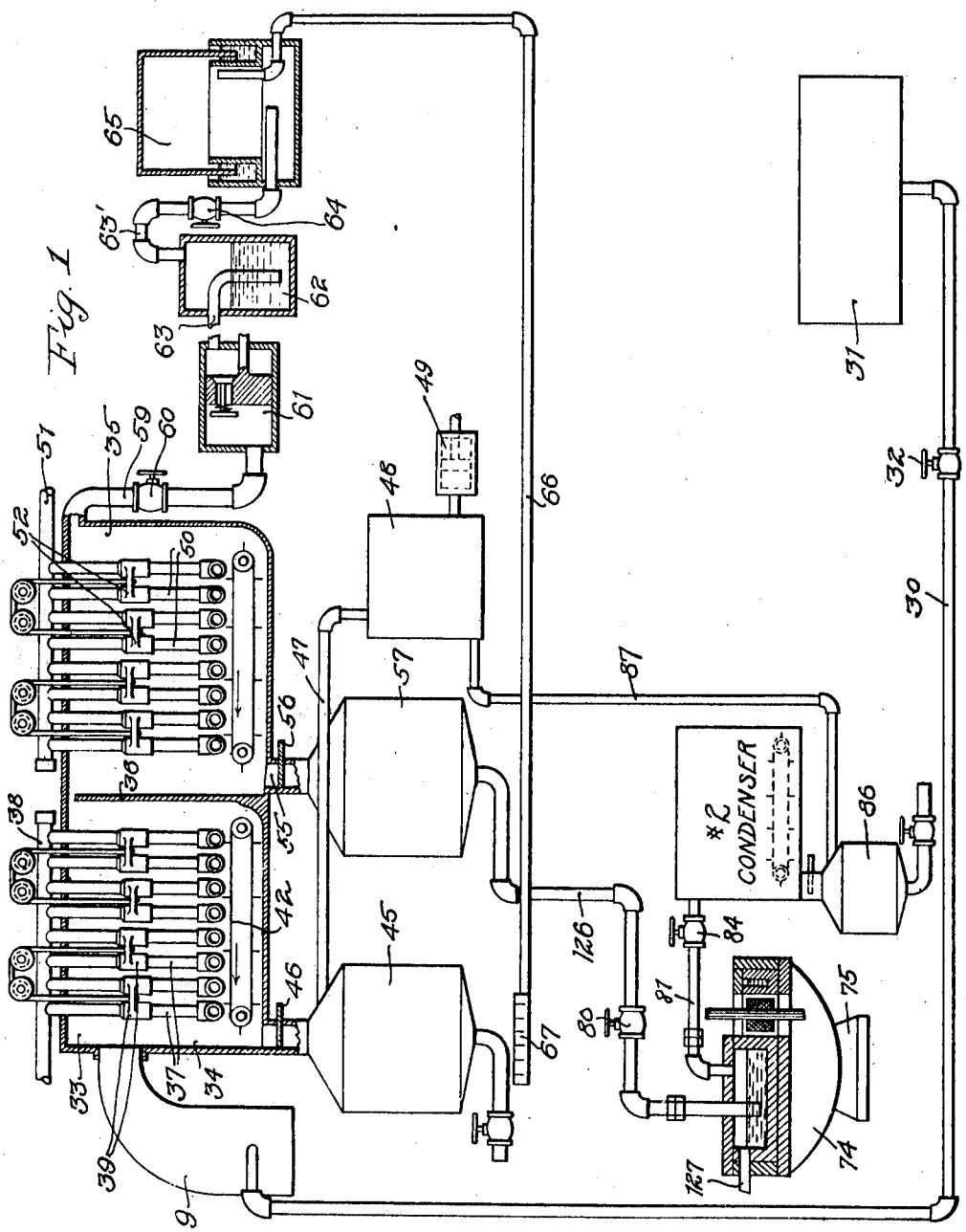
Figure 1 is a more or less diagrammatic representation of the entire system of apparatus.

Referring first to Fig. 1, it will be seen that the chlorinizing furnace is shown at 9. The details of this furnace are unimportant in connection with the present application and it suffices to say that a charge is introduced into the chlorinizing furnace, which is preferably heated by electrical means. A pipe 30, which comes from a storage tank 31, is led into the chlorinizing furnace, as indicated in the drawing, and in this way the charge in the furnace is treated with chlorin gas from the storage tank 31, the connection being controlled by a valve 32. Assuming that the charge in the furnace is of one of the higher grades of clay, such as kaolin, I treat this charge with the chlorin gas in the presence of carbon. With the current properly applied to the furnace electrodes, the activity of the chlorin gas and the heat immediately effect the disintegration of the kaolin, the formation of aluminum chlorid and silicon tetrachlorid, and, by the combination of the carbon and the oxygen liberated from the kaolin, the formation of carbon monoxid.

The three gases thus formed naturally arise and pass out of the chlorinizing furnace 9 and are conducted to a condenser 33. This condenser is in the form of a double closed chamber providing the compartment 34 and the compartment 35, separated by a partition 36. The compartment 34 is provided with a system of cooling pipes 37, 37, which extend downwardly through and from the top of the chamber and which are distributed throughout the entire space of this particular compartment in order to get a complete temperature control. The pipes 37, 37 are joined at the upper end, outside of the chamber, by means of the header pipe 38, and circulation is secured in any desirable manner. In this particular condenser element the system of pipes is connected to a cold water supply and the result is that as the three gases which have been referred to enter and pass through the compartment 34 the aluminum chlorid gas, which condenses at a higher temperature than the silicon tetrachlorid gas, is condensed and deposits itself as a white powder upon the pipes 37, 37.

Since the temperature which is produced by the circulation of mere cold water in the cooling pipes 37, 37 is not sufficiently low to condense silicon tetrachlorid, this gas, together with the carbon monoxid, passes on to the next compartment 35 of the condenser. Thus the first condenser element 34 is devoted to the condensation of the aluminum chlorid, and the white powder to which it is reduced is removed from the pipes upon which it is deposited by means of the scrapers 39, 39. The powder is thus thrown down on to the conveyer 42 and carried to a tank 45, the connection to which is controlled by a valve 46. It will be seen that this tank is connected by means of a pipe 47, with a compressed air tank 48, which is fed through the air-compressor 49. It is important, as before indicated, that the system be a closed system and that various actions be carried on under pressure, and I speak of it particularly at this time because of the fact that the aluminum chlorid to which I have just referred is extremely deliquescent and must be kept free from moisture in order to avoid decomposition and the formation of hydrochloric acid. When the system is closed, however, such a result is not possible, and the inclosure is effective in condensing and keeping condensed this volatile substance, the pressure having a purpose referred to later.

Leaving the aluminum chlorid which has been deposited in the tank, I shall follow the course of the silicon tetrachlorid gas and the carbon monoxid through the second element of the condenser. The condenser element 35 is provided with a system of cooling pipes 50 like the pipes 37, these pipes having the outside header 51 and being provided with scrapers 52, 52. Instead of being supplied with mere cold water, however, the cooling pipes 50 are supplied with a freezing mixture of ice water and salt, and the temperature in the condenser element 35 is therefore considerably lower than the temperature in the condenser element 34. The lower temperature is sufficient to condense the silicon tetrachlorid, which comes down as a colorless liquid, except for any impurities which may discolor it. This liquid silicon tetrachlorid passes down the sloping bottom of the condenser element 35 and passes through the outlet 55, controlled by the valve 56, which leads to the tank 57. The scrapers 52 remove any aluminum chlorid which may not have been condensed in the first condenser element.

The carbon monoxid passes out of the condenser element 35 through a pipe 59, past a valve 60, into a closed gas pump 61, and is then carried to a scrubber 62 by means of a pipe 63, this scrubber being in the form of a tank containing lime water and having an outlet pipe 63[1] leading therefrom. This outlet pipe is provided with a valve 64 and leads to a telescoping gas tank 65, so that pressure may be kept upon the carbon monoxid which finds its way to this tank, and so that the carbon monoxid may be fed by way of a pipe 66 to a burner 67 which may be disposed under the tank 45 and used to melt the aluminum chlorid if so desired, for which purpose the pressure from the tank 48 is also employed.

Figure 2:
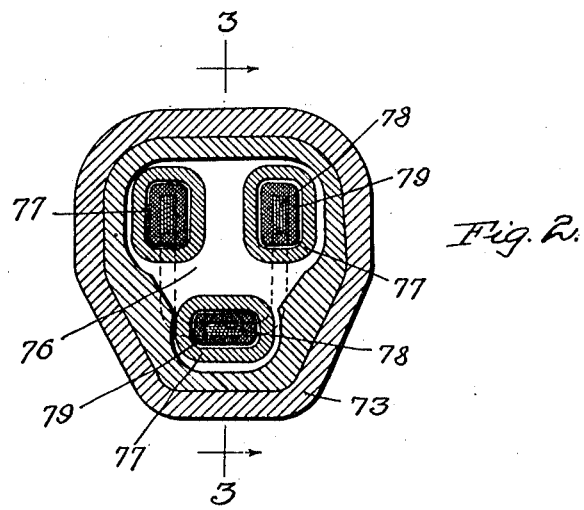
Fig. 2 is a sectional view taken on a horizontal plane of the furnace which is employed; and, Fig. 3 is a sectional view taken on the plane of the lines 3—3 of Fig. 2 and looking in the direction indicated by the arrows.
Figure 3:
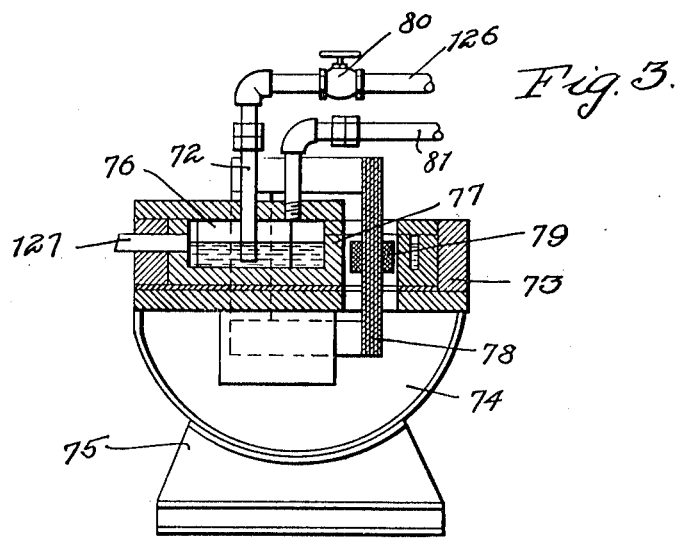

It will be seen that a pipe 126 leads from the tank 57 to a furnace, preferably of the Rodenhauser three-phase type, this furnace being shown in detail in Figs. 2 and 3. This furnace comprises a heavy outer housing 73, which is provided with a round bottom 74, mounted in a correspondingly shaped base 75, the idea being that when the connecting pipes are temporarily detached, the furnace can be tilted in order to tap off molten material, as will be pointed out a little later. The lining of the furnace provides a cavity 76 for the molten material, which is formed between and around the tubular casing parts 77, 77, within which the magnetic circuit frame and the primary coils 78 and 79, respectively, are disposed. The precise details of this furnace itself do not constitute part of my present invention, but I refer to them because it is a type of furnace well adapted for use as part of my system. However, the feed pipe 72 goes down through the cover of the cavity 76 to a point near the bottom of the cavity. The pipe 126 which connects with the feed pipe 72 is provided with a valve 80, which controls the passage of the silicon tetrachlorid to the Rodenhauser furnace, in which a bath of molten aluminum is provided, as indicated. When the valve 80 is opened the silicon tetrachlorid passes to the aluminum bath and as it strikes the molten aluminum it is reconverted into a gas and rises through the molten aluminum, and chemical action is immediately begun, due to the greater affinity of the chlorin for the aluminum than for the silicon. In this way the aluminum displaces the silicon in the chlorid and free silicon and aluminum chlorid gas are formed. The free silicon is tapped from the Rodenhauser furnace by way of the spout 127, and the aluminum chlorid gas is passed on to condenser No. 2 by way of the pipe 81, which is provided with a valve 84. This condenser No. 2 acts precisely as does the condenser element 34 and brings the aluminum chlorid down as a powder into the tank 86, which has connection with a source of compressed air by way of the pipe 87, and which may be provided with a burner if so desired.

It is important that the system be a closed system, as described, to exclude the moisture and to protect the active chlorid. It will be seen that the apparatus which I have illustrated and described is constructed toward this end.

It will be apparent to those skilled in the art that various modifications might be made in this system without departing from the spirit or scope thereof. For instance, one might use fused zinc, instead of fused aluminum, for breaking up the silicon tetrachlorid. This suggestion is presented so that those skilled in the art may be as fully advised as possible and so that it may be clear that my invention is to be measured in its broader aspects as set forth in the broader of the appended claims, and in its more limited aspects as set forth in the more specific claims.

I claim as new and desire to secure by Letters Patent of the United States:

1. The process of securing an element from its compounds, which consists in feeding the compound to a point near the bottom of a bath of metal in molten condition, so that the compound will rise through the molten metal and so that the metal may be substituted for said element, leaving the element in its free, elemental state.

2. The process of securing an element from its chlorid, which consists in feeding the chlorid to a point near the bottom of a bath of a molten metal, so that the chlorid will rise through the molten metal and so that the metal may be substituted for said element, leaving the element in its free, elemental state.

3. The process of securing silicon from its chlorid, which consists in feeding the chlorid to a point near the bottom of a bath of molten aluminum so that the chlorid will rise in the aluminum and reaction take place so as to form aluminum chlorid and the silicon.

4. The process of securing silicon from its chlorid, which consists in feeding it to a point near the bottom of a bath of molten metal so that the chlorid will rise in the molten metal and reaction take place so as to form the chlorid of said metal and the silicon.

5. The process of securing silicon from its chlorid, which consists in feeding it to a bath of molten aluminum to form the chlorid of said metal and silicon, and then tapping off the silicon and collecting the aluminum chlorid.

6. The process of securing silicon from its chlorid which consists in feeding it to a bath of molten aluminum to free aluminum chlorid and silicon in a moisture-free atmosphere.

7. The process of securing silicon from its chlorid which consists in feeding it in liquid condition to a bath of molten aluminum to form aluminum chlorid and silicon, conducting away the aluminum chlorid in gaseous condition, and then tapping off the silicon.

8. The process of securing an element from its chlorid which consists in feeding the chlorid in liquid condition to a point near the bottom of a bath of another element in molten condition so that the heat of the molten element will transform the liquid chlorid into a gas which will rise through the molten element to effect a reaction whereby the latter element will be substituted for the former to form a chlorid of the latter element, and conducting said last named chlorid away in gaseous condition, leaving the first named element in elemental state.

In witness whereof, I hereunto subscribe my name this 11th day of January A. D., 1915.

VICTOR M. WEAVER.

Witnesses:
 J. L. STEWART,
 G. L. CULLMERRY.